United States Patent
Phillips et al.

(10) Patent No.: US 8,628,737 B2
(45) Date of Patent: Jan. 14, 2014

(54) TRANSFER OF SLURRY IN A BAYER PROCESS

(75) Inventors: Everett C. Phillips, Corpus Christi, TX (US); Michael G. Strominger, Naperville, IL (US); Peter A. Dimas, Wheaton, IL (US)

(73) Assignee: Nalco Company, Naperville, IL (US)

( * ) Notice: Subject to any disclaimer, the term of this patent is extended or adjusted under 35 U.S.C. 154(b) by 793 days.

(21) Appl. No.: 11/558,205

(22) Filed: Nov. 9, 2006

(65) Prior Publication Data

US 2008/0110837 A1    May 15, 2008

(51) Int. Cl.
*C01F 1/00* (2006.01)
*C01F 7/04* (2006.01)

(52) U.S. Cl.
USPC .......................................... 423/121; 210/767

(58) Field of Classification Search
USPC .......................................... 423/121; 210/767
See application file for complete search history.

(56) References Cited

U.S. PATENT DOCUMENTS

| | | | | |
|---|---|---|---|---|
| 5,275,628 A | * | 1/1994 | Dimas et al. | 23/305 A |
| 5,346,511 A | * | 9/1994 | Dimas | 23/293 R |
| 5,380,464 A | * | 1/1995 | McGee et al. | 516/118 |
| 6,036,869 A | * | 3/2000 | Selvarajan et al. | 210/733 |
| 6,365,116 B1 | | 4/2002 | Barham et al. | |
| 6,676,910 B1 | * | 1/2004 | Rosenberg et al. | 423/115 |
| 6,814,917 B1 | * | 11/2004 | Watanabe et al. | 264/434 |
| 7,442,722 B2 | * | 10/2008 | Sui et al. | 516/133 |
| 7,767,190 B2 | * | 8/2010 | Rosenberg et al. | 423/600 |

FOREIGN PATENT DOCUMENTS

AU            634504         2/1993

* cited by examiner

*Primary Examiner* — Melvin C Mayes
*Assistant Examiner* — Melissa Stalder
(74) *Attorney, Agent, or Firm* — Leydig, Voit & Mayer, Ltd.

(57) ABSTRACT

The present disclosure is directed to a method of improving the transfer of slurry in a Bayer process through the addition of one or more chemical species to a Bayer process, wherein said chemical species is selected from the group consisting of: non-ionic surfactants, polyglycols, polyglycol ethers, anionic surfactants, anionic polymers, and a combination thereof. The present invention is also directed to a method of deaerating a slurry in a Bayer process through the addition of an effective amount of one or more chemical species to a Bayer process, wherein said chemical species is selected from the group consisting of: non-ionic surfactants, polyglycols, polyglycol ethers, anionic surfactants, anionic polymers, and a combination thereof.

5 Claims, No Drawings

TRANSFER OF SLURRY IN A BAYER PROCESS

FIELD OF THE INVENTION

The present disclosure relates to a method of improving the transfer of slurry from one point in the Bayer process to another. The present invention further discloses a method of deaerating a slurry in a Bayer process.

BACKGROUND

The Bayer process is the most common process used to produce alumina ($Al_2O_3$) from bauxite ore. Alumina producers are constantly striving to make the Bayer process more economical; producers want to be able to make as much alumina as possible at the lowest operating costs. One aspect of the Bayer process that directly impacts process economics is the production of and the transfer of slurry. Specifically, the transfer of bauxite and red mud containing slurries are problematic.

Bauxite containing slurries are formed when bauxite is mixed with liquid, such as the spent liquor. Depending upon bauxite hardness and particle size, a grinding stage may be necessary to form transferable slurry, for example pumpable slurry. Ball mills, rod mills, or combined rod and ball mills may be used to wet grind the bauxite so that slurry can be made. Once this slurry is formed it then needs to be transferred to other stages of the Bayer process, one of which is a critical stage, the digestion stage, which involves the extraction of alumina from bauxite containing slurry.

Red mud slurries contain red mud and Bayer process liquor. This type of slurry, for example, needs to be transferred from the red mud settler to the red mud washers.

Various apparatuses, for example one or more pumps, are used to transfer slurry from one point in the Bayer process to another. Problems with slurry throughput can occur through these apparatuses. Specifically, the rate of transfer through pumps and other apparatuses may be slower than design. For example, in one Bayer process plant, some pumps were found to be capable of only transferring 60% of their design flow.

Gravimetric forces also play a role in the transfer of slurry of one point in the Bayer process to another.

Improvements in the efficiency of slurry transfer in a Bayer process are addressed in this disclosure.

SUMMARY OF THE INVENTION

This disclosure provides for a method of improving the transfer of slurry in a Bayer process comprising: (a) adding an effective amount of one or more chemical species to a slurry of said Bayer process, or to a liquid component added to said slurry and/or solid component added to said slurry, or a combination thereof, wherein said chemical species is selected from the group consisting of: non-ionic surfactants, polyglycols, polyglycol ethers, anionic surfactants, anionic polymers, and a combination thereof; and (b) optionally providing one or more apparatuses capable of transferring said slurry from one location to another in said Bayer process.

This disclosure also provides for a method of deaerating a slurry in a Bayer process comprising: adding an effective amount of one or more chemical species to a slurry of said Bayer process, or to a liquid component added to said slurry and/or solid component added to said slurry, or a combination thereof, wherein said chemical species is selected from the group consisting of: non-ionic surfactants, polyglycols, polyglycol ethers, anionic surfactants, anionic polymers, and a combination thereof.

DETAILED DESCRIPTION OF THE INVENTION

Definitions

"Slurry" refers to a suspension containing a solid component and a liquid component, wherein said solid component contains bauxite or red mud.

"Non-ionic surfactants" mean surfactants that do not have any residual charge.

"Anionic surfactants" mean surfactants that have a net negative charge prior to or upon the addition of surfactants to the slurry.

"Anionic polymers" mean polymers having a net negative charge that are water soluble polymers and have an intrinsic viscosity in 2 N $NaNO_3$ of from about 0.01 to about 0.25 dl/g. One of ordinary skill in the art would know how to measure intrinsic viscosity; one protocol is delineated in U.S. Pat. No. 6,048,463 to Selvarajan et al., which is herein incorporated by reference.

"Grinding stage" refers to the stage of a Bayer process where a Bayer process slurry is formed by grinding a solid containing bauxite by some mechanical means, such as by using a ball mill, a rod mill or a combined rod and ball mill, with a liquid, such as spent liquor. The grinding stage is known to one of ordinary skill in the art; it may otherwise be referred to as the grinding circuit. There are many permutations to the grinding stage and those permutations shall be encompassed by this disclosure as well.

"Digestion stage" is the primary stage where alumina is extracted from the bauxite slurry. The digestion stage is known to one of ordinary skill in the art. There are many permutations to the grinding stage and those permutations shall be encompassed by this disclosure as well.

"Deaeration" or "deaerating" refers to the release of entrained air from a slurry.

Preferred Embodiments

There are many different types of Bayer process plants that serve to extract alumina from bauxite. This disclosure serves to capture all types of Bayer process plant operations.

In one embodiment, the slurry is formed by combining said solid component with said liquid component, and optionally wherein said liquid component is a spent liquor, and optionally grinding said solid component prior to forming said slurry and/or grinding said slurry.

In another embodiment, the solid component contains bauxite.

In another embodiment, the grinding occurs in a ball mill and/or a rod mill.

Bayer process slurries move from one point to another with the assistance of gravity and/or by mechanical means, for example, one or more pumps are positioned at various points where these slurries flow. Other apparatuses capable of transfer slurry, which are known to those of ordinary skill in the art, may be used as well.

Entrained air in a slurry will adversely affect slurry flow, pump capacities and energy used to transfer the slurries through the Bayer process, such as through the grinding stage, and flow from the digestion stage to the red mud settlers, for example, from the last flash tank in the digestion stage to the red mud settlers.

In one embodiment, the transfer of slurry is from a receptacle/tank, which holds said slurry to a digestion tank.

In another embodiment, the transfer of slurry is from a grinding stage of said Bayer Process to a digestion stage of said Bayer Process. In a further embodiment, a pump transfers said slurry through a conduit from a grinding stage of a Bayer process to a digestion stage of a Bayer process.

In another embodiment, the transfer of slurry is from a flash tank to a red mud settler.

Many different types of chemical species may be utilized to improve the transfer of slurry in a Bayer process and/or deaerate the slurry. In general, the chemical species include non-ionic surfactants, polyglycols, polyglycol ethers, anionic surfactants, anionic polymers, and a combination thereof. These chemical species may be added alone or in combination with one another. More than one chemical species may be added, as well.

Non-ionic surfactants may be utilized to improve the transfer of slurry in the Bayer process. There are many different types of non-ionic surfactants known to those of ordinary skill in the art.

In one embodiment, the non-ionic surfactants are selected from the group consisting of: oxyalkylated alcohols; ethoxylated alcohols; propoxylated alcohols; polyether polyol; propoxylated glycerine/sucrose; ethylene oxide/propylene oxide block copolymer; ethoxylated alkylphenols; ethoxylated octylphenols; ethoxylated nonylphenols; ethoxylated nonylphenols/tall oil fatty acid; fatty alcohol ethoxylate; alkylphenol ethoxylate; fatty acid ethoxylate; fatty amide ethoxylate; fatty amine ethoxylate; alkyl glucoside; sorbitan alkanoate; ethoxylated sorbitan alkanoate; and a combination thereof.

Ethoxylated alcohols include Tergitol® 15-S-15, Tergitol® 15-S-12, and Tergitol® 15-S-9, which are all available from The Dow Chemical Company, Midland, Mich.

Polyether polyols include Voranol-446, which is available from The Dow Chemical Company. Voranol 446 contains propoxylated glycerine and sucrose.

Ethylene oxide/propylene oxide block co-polymers include PLURONIC® and PLURONIC®R, which are available from BASF Corporation.

Ethoxylated nonylphenols are available from Nalco Company, Naperville, Ill.

Polyglycols may be utilized to improve the transfer of slurry in the Bayer process. There are many different types of polyglycols known to those of ordinary skill in the art. Polyglycols include DOWFROTH® 250, which is available from The Dow Chemical Company. DOWFROTH 250 contains a mixture of polyglycols and polyglycol ethers.

In one embodiment, the polyglycols are polypropylene glycols. Polypropylene glycols are available from Nalco Company, Naperville, Ill.

In another embodiment, the polyglycols have an average molecular weight of from about 200 to about 1200.

In another embodiment, the polyglycols have an average molecular weight of from about 400 to about 800.

Anionic surfactants may be utilized to improve the transfer of slurry in the Bayer process. There are many different types of anionic surfactants known to those of ordinary skill in the art. Anionic surfactants are available from Nalco Company, Naperville, Ill.

In one embodiment, the anionic surfactants are selected from the group consisting of: alkyl sulfate; alkyl ethercarboxylate; alkylbenzene sulfonate; dialkyl sulfosuccinate; alkyl phosphate; alkyl etherphosphate; tall oil fatty acid/ ethoxylated nonylphenol; dioctyl sulfosuccinate; and a combination thereof.

Anionic polymers may be utilized to improve the transfer of slurry in the Bayer process. There are many different types of anionic polymers known to those of ordinary skill in the art. Anionic polymers are available from Nalco Company, Naperville, Ill.

In one embodiment, the anionic polymers are acrylic acid containing polymers.

In another embodiment, the anionic polymers are sulfonated.

In another embodiment, the anionic polymers are acrylic acid/methacrylate copolymers.

In another embodiment, the anionic polymers are terpolymers.

The chemical species may be added to slurry via different routes. The chemical species may be added to: the solid component of the slurry, which may contain bauxite; the liquid component of the slurry, which may contain spent liquor, evaporated liquor, or a combination thereof; and it may be added to the slurry itself. The chemical species may be added at one or more these stages. Preferably, the chemical species may be added as a solution to the slurry. Moreover, it is advantageous that the solution is at ambient temperature and ambient pressure.

The slurry may have various physical and chemical properties.

In one embodiment, the slurry is an alkaline slurry.

In another embodiment, the slurry is at an elevated temperature of less than about 110° C.

In another embodiment, the slurry is at an elevated temperature from about 65° C. to about 100° C.

In another embodiment, the solution is added to slurry at ambient temperature and ambient pressure.

In another embodiment, the chemical species is in liquid form at ambient temperature and ambient pressure.

Various amounts of chemical species may be added to improve the transfer of slurry in the Bayer process. One of ordinary skill in the art could determine the amount without undue experimentation. Such factors, as the chemical species, the slurry components, and viscosity of the slurry, are important in determining the amount of chemical species that should be added so that an improvement in the transfer of slurry can occur. Concentrations expressed in this application are based upon the neat solution of chemical species or product combination if more than one species is applied.

Preferably, an effective amount of chemical species is about 15 ppm.

In one embodiment, the effective amount of chemical species is greater than about 5 ppm.

In another embodiment, the effective amount of chemical species is from about 5 ppm to about 50 ppm.

In another embodiment, the effective amount of chemical species is from about 5 ppm to about 15 ppm.

The following examples are not meant to be limiting.

EXAMPLES

Example 1

A series of five plant tests were conducted in the grinding stage of a Bayer processing plant. All tests were typically 2 to 4 hrs in length. Compound "A", (60% polyether polyol, 10% propylene glycol chains, part methyl-terminated, 30% water), available from Nalco Company, was dosed neat to either the bauxite slurry feeding the ball mills or to the spent liquor feeding the rod mills in amounts of 15-30 ppm, as set out in Table I below.

TABLE I

| Test | Applications of Compound A |
|---|---|
| 1 | #1 & 2 Ball Mills - into underflow of cyclones |
| 2 | Ball Mills - #1 into cyclone underflow and #2 into slurry feed prior to cyclone |
| 3 | Into Spent Liquor Feed to all Rod Mills |
| 4 | #1 Ball Mill - into feed prior to cyclone |
| 5 | #1 Ball Mill - into feed prior to cyclone |

In all plant tests, data for the following parameters: slurry flow rate, pump speed (expressed as a % of maximum output), and pump amps for each discharge pump used to transfer the slurry, were obtained from the plant automated control system. Meter outputs were continuously recorded by a central computer system each minute on a given test day. Additionally, milling (or grind) rates were computed based on bauxite and slurry flow measurements. Average results were computed for each parameter before, during and after test periods and for each dosage level of Compound A used during the test period. The results for all tests are given in the series of Tables II to V below. Occasionally the energy usage (Kwatts) for certain transfer pumps was recorded from remote digital display units near the pumps.

The amount of entrained gas in the mill discharge slurry was also evaluated at least three times prior to the start of any test and then typically every 10-15 minutes during a test. This involved collecting samples of the slurry in a graduated cylinder at the mill discharge. Immediately, the initial volume of the slurry was recorded, after which the slurry was agitated 20 times with a plunger and then allowed to stand for 15 min. Following this settling period, the final slurry volume was recorded. The change in volume versus the initial volume was used to calculate the amount of entrained gas (expressed as a % volume/volume). After each dosage change, the amount of entrained gas was determined after 20 min. One hour after the completion of each test the amount of entrained gas was re-checked to determine if it returned to the same level prior to the test.

Table II summarizes the bauxite slurry flow rate, average pump speeds, and the amount of entrained gas in the discharge from the ball mills during the two initial plant screening trials of Compound A.

The dose of Compound A was computed from the metered flow rate of the material and the bauxite slurry flow rate at various times in the test period. Clearly the addition of the Compound A had a significant impact on reducing the amount of entrained gas in the slurry at the discharge of the Ball Mills and as a result pump speeds decreased considerably at a given flow rate. For example, 10-30 ppm of Compound A, reduced the entrained gas from 19 v/v % to approximately 11.5-13% and pump speeds decreased from the 38-51% range down to 14-17%. Test 2 clearly demonstrated that the best slurry degassing occurred when Compound A was added to the bauxite slurry prior to the cyclone (rather than to the cyclone underflow stream). For example, application of Compound A to the slurry before the cyclone on Ball Mill #2 gave a >70% reduction in the entrained gas while only a 40% reduction in entrained gas was observed by dosing compound A to the underflow of the cyclone ahead of Ball Mill #1. Most importantly, treatment of the bauxite slurry with Compound A, decreased mill discharge pumps speeds greatly and allowed for an increase in flow rate from the 970 gpm range to 1274 gpm while maintaining the pump speed below 50% output.

TABLE II

| | | | | | | | | TEST 1 and 2 | | | | |
|---|---|---|---|---|---|---|---|---|---|---|---|---|
| | | | | Mill # 1 | | | | | Mill # 2 | | | |
| Test No. | Test Period | Application Point | "A" Dose, ppm | Slurry Flow gpm | Pump Speed % | Entrained Air v/v % | Application Point | "A" Dose, ppm | Slurry Flow gpm | Pump Speed % | Entrained Air v/v % |
| 1 | | Before test | 0 | 816 | 36.1 | 15.7 | Before test | 0 | 824 | 38.0 | 19.0 |
| | 2.25 hr | Underflow of cyclones | 15 | 788 | 30.3 | 12.7 | Underflow of cyclones | 15 | 820 | 14.6 | 17.2 |
| | | | 19 | 809 | 29.9 | 8.7 | | 19 | 807 | 15.5 | 15.0 |
| | | | 40 | 755 | 29.3 | 7.1 | | 37 | 784 | 14.6 | 11.5 |
| | | After test | 0 | 735 | 32.4 | 13.5 | After test | 0 | 768 | 23.1 | 19.8 |
| 2 | | Before test | 0 | 1047 | 59.8 | 20.2 | Before test | 0 | 969 | 44.8 | 15.0 |
| | 2.5 hr | Underflow of Cyclones | 15 | 1068 | 49.5 | 14.5 | Prior to Cyclone | 15 | 967 | 12.5 | 11.2 |
| | | | 27 | 1175 | 65.4 | 13.0 | | 27 | 1048 | 17.6 | 4.2 |

TABLE II-continued

TEST 1 and 2

| | | | Mill # 1 | | | | Mill # 2 | | | |
|---|---|---|---|---|---|---|---|---|---|---|
| Test No. | Test Period | Application Point | "A" Dose, ppm | Slurry Flow gpm | Pump Speed % | Entrained Air v/v % | Application Point | "A" Dose, ppm | Slurry Flow gpm | Pump Speed % | Entrained Air v/v % |
| | | After/Before test | 0 | 1189 | 74.4 | 19.3 | After/BeforeTest | 0 | 1089 | 56.3 | 15.3 |
| | 2.0 hr | Underflow | 28 | 1181 | 71.8 | 12.4 | Prior to | 28 | 1076 | 21.2 | 5.5 |
| | | of Cyclones | 45 | 932 | 51.8 | 11.7 | Cyclone | 33 | 1274 | 31.5 | 4.1 |
| | | After test | 0 | 1095 | 70.9 | 18.9 | After test | 0 | 1050 | 60.3 | 14.3 |

Table III displays the results from Test 3, which involved the application of Compound A to the spent liquor feeding the Rod Mills. During this test the amount of entrained gas was monitored at the discharge of the rod mills as well as down stream at the discharge of the Ball Mills. The results show significant reductions in entrained gas as well as improvements in pump performance for both the rod mills and the ball mills and this indicates a degree of persistency across the circuit. However, for optimum performance and slurry transfer, an additional application of Compound A prior to the Ball Mills may be needed.

TABLE III

TEST 3

| | Mill # | Slurry Flow | % ENTRAINED Gas B/D/A/REG | PUMP SPEEDS B/D/A/REG | PUMP AMPS B/D/A/REG |
|---|---|---|---|---|---|
| Rod Mills | 1 | | 14.4/9.0/15.5/39% | 56/53/NA/5% | 69/69/NA/0% |
| | 2 | | 8.9/6.4/10.8/35% | NA/NA/NA/NA | NA/NA/NA/NA |
| | 3 | | 14.9/7.3/16.4/54% | 60/56/NA/7% | 55/52/NA/5% |
| | 4 | | 9.6/4.8/9.8/51% | 54/48/NA/11% | 73/69/NA/5% |
| | 5 | | 20.0 | 62/48/NA/23% | 45/39/NA/13% |
| Ball Mills | 1 | 1180 | 13.4/14.6/15.5/−1% | 53/40/48/25% | 51/44/49/14% |
| | 2 | 1125 | 14.7/10.7/16.4/31% | 64/28/59/56% | 80/60/77/25% |
| | 3 | 780 | Not Measured | 56/51/57/9% | 49, 58/46, 60/49, 54/0-6% |

"B" means before test;

"D" means during test;

"A" means after test;

"REG" means reduction in entrained gas; and

"NA" means not applicable.

Tables IV and V, show the results from Tests 4 and 5, respectively. In both these tests Compound A was applied to the bauxite slurry prior to the cyclones on Ball Mill #1. The results in Table IV show once again, that Compound A dosed at 15 ppm to the slurry, allowed for a 50-60% decease in the amount of entrained gas in the slurry. As a result, the entire desired slurry flow could be transferred through a single pump instead of the need for using two transfer pumps.

TABLE IV

TEST 4

| Period | Compound "A" Dose ppm | No. of Transfer Pumps Used | Slurry Flow gpm | Pump Speed % | #1 Pump Amps | #1 Pump Kwatts | #2 Pump Amps | #2 Pump Kwatts | Entrained Air, v/v % | Reduction in Entrained Air |
|---|---|---|---|---|---|---|---|---|---|---|
| Before (1 hr) | 0 | 2 | 644 | 31 | 37 | 25 | 35 | 26 | 13 | 58% |
| During | 15 | 2 | 663 | 38 | 38 | 18-33 | 39 | 17-32 | 5.4 | |
| | 15 | 1 | 644 | 34 | 43 | 37 | 0 | 0 | 5.5 | 48% |
| After | 0 | 1 | 505 | 33 | 40 | n.d. | 0 | n.d. | 10.6 | |
| | 0 | 2 | 510 | 33 | 39 | n.d. | 29 | n.d. | nd. | — |

The results in Table V show once again, Compound A dosed between 15-30 ppm to the slurry gave a 50-60% decrease in the amount of entrained gas in the slurry. The slurry flow and the Milling (grind) rate (tons of bauxite/hr) were greatly increased from the normal operating range of 1450 gpm and 475 t/hr to 2100 gpm and 625 t/hr, respectively. This was achieved while maintaining normal pump speeds and with significant reduction in the energy consumption for the two Ball Mill discharge pumps.

TABLE V

TEST 5

| Period | Compound "A" dose ppm | Slurry Flow gpm | Grind Rate t/hr | Pump Speed % | #1 Pump Amps | #1 Pump Kwatts | #2 Pump Amps | #2 Pump Kwatts | Entrained Gas, v/v % | Reduction in Entrained Gas |
|---|---|---|---|---|---|---|---|---|---|---|
| Before | 0 | 1451 | 474 | 93 | 84 | 142 | 86 | 144 | 18.6 | — |
| During | 15 | 1750 | 506 | 50 | 57 | 58 | 56 | 62 | 7.5 | 60% |
| | 30 | 2050 | 610 | 69 | 79 | 110 | 79 | 114 | 8.5 | 55% |
| | 15 | 2150 | 635 | 71 | 80 | 115 | 80 | 119 | 9.3 | 50% |
| After | 0 | 1050 | 555 | 53 | 51 | n.d. | 44 | n.d. | n.d. | — |

"n.d." means not determined.

Example 2

The relative degassing rate was measured as a function of chemical species added to the slurry, dose and contact time with a particular slurry sample. The test slurry was collected after the Ball Mill. The test comprised the following steps. First, a slurry sample was collected from the discharge of the ball mill into a 1 liter graduated plastic graduated cylinder. A solution of chemical species was then added to the top of the slurry at a specific dose and mixed with the slurry using a perforated plunger. The change in the slurry volume was then measured as a function of constant mixing and over time. This data was then used to compute a relative degassing rate for each dose of the chemical species. The degassing rates were compared to the degassing rate of untreated samples (Control).

TABLE VI

| Chemical Species | Chemistry | Dose (ppm) | Degassing Rate Relative to Control |
|---|---|---|---|
| Tergitol 15-S-15, | 15 mole EO on C12-14 secondary alcohol | 5-10 | 2-3.5x |
| Tergitol 15-S-12, | 12 mole EO on C12-14 secondary alcohol | 5-10 | 2-3.5x |
| Voranol 446 | Polyether Polyol (Propoxylated glycerine/sucrose) | 5-10 | 2.2-2.5x |
| Compound B | Tall oil fatty acid & ethoxylated nonylphenol | 5-10 | 2.0-2.5x |
| PLURONIC ® F77, BASF | Block co-polymer of ethylene oxide and propylene oxide | 5-10 | 1.5-2.5x |
| Dowfroth 250, Dow | Mix. of propylene glycol chains, part methyl-terminated | 5-10 | 1.2-2.0x |
| Pluronic F38, BASF | Block co-polymer of ethylene oxide and propylene oxide | 5-10 | 1.3-1.9x |
| DOSS, 40% (Dioctyl sulfosuccinate) | Dioctyl sulfosuccinate, Na salt in water/alcohols | 5-10 | 1.3-1.9x |
| Compound C | Polyproylene glycol, 475 mw | 5-10 | 1.7-1.8x |
| Compound D | Polyproylene glycol, 800 mw | 5-10 | 1.7-1.8x |
| Pluronic L44, BASF | Block co-polymer of ethylene oxide and propylene oxide | >>10 | 1.0-1.5x |
| Compound E | 15% aq solution of 9.5 mole EO on nonylphenol | >>10 | 1.0-1.5x |

TABLE VI-continued

| Chemical Species | Chemistry | Dose (ppm) | Degassing Rate Relative to Control |
|---|---|---|---|
| Compound F | Acrylamide-Acrylic acid co-polymer, sulfomethylated | >>10 | 1.0-1.5x |
| Compound G | Acrylic Acid-Methacrylate co-polymer | >>10 | 1.0-1.5x |

We claim:

1. A method of improving efficiency in pumping bauxite containing slurry in a Bayer process having a digestion stage, the method comprising:
   providing a bauxite containing slurry;
   combining with the bauxite containing slurry at a mill an amount of a single solution comprising
      six parts by weight propoxylated glycerine to
      one part by weight partially methyl-terminated polypropylene glycol having a molecular weight of from about 400 to about 800 Daltons
   thereby creating a treated slurry containing from 5 to 50 ppm of the single solution; and
   pumping the treated slurry using at least one pump;
   wherein the efficiency of the at least one pump improves compared to an untreated bauxite containing slurry, the improvement in efficiency determined by at least one of: at least maintaining treated slurry discharge rate under decreased pump speed; increasing treated slurry discharge rate under maintained or decreased pump speed; decreasing average energy of pumping for at least maintained treated slurry discharge rate; decreasing average pump amperage for at least maintained treated slurry discharge rate; and decreasing the quantity of pumps in service.

2. The method of claim 1, wherein the treated slurry contains from 30 to 75% less entrained gas than the bauxite containing slurry prior to treatment.

3. The method of claim 1, wherein the propoxylated glycerine and the partially methyl-terminated polypropylene glycol are each combined simultaneously with the bauxite containing slurry.

4. The method of claim 1, wherein the mill is a ball mill.

5. The method of claim 1, wherein the mill is a rod mill.

* * * * *